(12) United States Patent
Baudry

(10) Patent No.: US 7,367,526 B2
(45) Date of Patent: May 6, 2008

(54) DEVICE AND SYSTEM FOR ASSISTANCE WITHIN INTERCEPTION BY AN AIRCRAFT OF A FLIGHT PATH SEGMENT

(75) Inventor: Jean-Pierre Baudry, Toulon (FR)

(73) Assignee: Eurocopter, Marignane Cedex (FR)

( * ) Notice: Subject to any disclaimer, the term of this patent is extended or adjusted under 35 U.S.C. 154(b) by 0 days.

(21) Appl. No.: 11/636,439

(22) Filed: Dec. 11, 2006

(65) Prior Publication Data
US 2007/0145184 A1    Jun. 28, 2007

Related U.S. Application Data

(62) Division of application No. 10/723,064, filed on Nov. 26, 2003, now Pat. No. 7,237,747.

(30) Foreign Application Priority Data
Nov. 27, 2002    (FR) .................................. 02 14872

(51) Int. Cl.
*B64C 13/24* (2006.01)
(52) U.S. Cl. .................................. 244/76 R
(58) Field of Classification Search .................. 244/75, 244/76 R, 177, 183, 184, 194, 198, 118.5; 342/476, 178; 340/946, 980; 434/20–49, 434/243, 241
See application file for complete search history.

(56) References Cited

U.S. PATENT DOCUMENTS

| | | |
|---|---|---|
| 2,932,023 A | 4/1960 | Haskins |
| 3,573,827 A | 4/1971 | De Botton et al. |
| 3,697,022 A | 10/1972 | Autechaud et al. |
| 3,824,381 A | 7/1974 | Swern |
| 3,989,209 A | 11/1976 | Feintuch et al. |
| 4,354,240 A | 10/1982 | Olive |
| 4,972,321 A | 11/1990 | Kahler |
| 5,371,581 A | 12/1994 | Wangler et al. |

(Continued)

FOREIGN PATENT DOCUMENTS

| | | |
|---|---|---|
| FR | 2783500 | 3/2000 |
| FR | 2783500 A | 3/2000 |
| WO | 0798685 | 10/1997 |
| WO | 98 05928 | 2/1998 |
| WO | 01 50087 | 7/2001 |

*Primary Examiner*—Timothy D. Collins
(74) *Attorney, Agent, or Firm*—Young & Thompson

(57) ABSTRACT

Device assisting with interception by an aircraft of a flight path segment located in a horizontal plane and a system of assistance with interception and follow-up of such a segment.

The device includes means of determining a ground speed vector and means of displaying to present, on a screen, a means of indication (10) of the ground speed corresponding to a first rectilinear section (10) in the horizontal plane, connected to a symbol (7) whose angular orientation corresponds to the direction of said ground speed vector and whose length is variable, a means of interception approach indication (12) corresponding to a second recipient section (3) in the horizontal plane of variable width and provided for as an extension of first rectilinear section (11) and a means of indication (14) of the interception turn corresponding to at least one circle arc (15) in the horizontal plane, provided to extend second rectilinear section (13).

11 Claims, 8 Drawing Sheets

U.S. PATENT DOCUMENTS

| | | |
|---|---|---|
| 5,465,142 A | 11/1995 | Krumes et al. |
| 5,695,157 A | 12/1997 | Coirier et al. |
| 6,108,595 A | 8/2000 | Asruc et al. |
| 6,255,965 B1 | 7/2001 | D'Orso |
| 6,574,532 B2 | 6/2003 | Lohmiller |
| 2001/0002817 A1 | 6/2001 | Berlioz et al. |

DEVICE AND SYSTEM FOR ASSISTANCE WITHIN INTERCEPTION BY AN AIRCRAFT OF A FLIGHT PATH SEGMENT

The present application is a Divisional of application Ser. No. 10/723,064 filed Nov. 26, 2003 now U.S. Pat. No. 7,237,747.

BACKGROUND OF THE INVENTION

1. Field of the Invention

This invention concerns a device for assistance with interception by an aircraft for a flight path segment located in a horizontal plane, and a system for assistance with the interception and follow-up of such a segment.

2. Description of Related Art

In general, when an aircraft pilot, for instance flying a helicopter, wishes to intercept a flight path in the horizontal plane, he has to perform the following operations:

- identify the flight path part (segment) to be reached, and take a heading for its interception allowing for the effect of wind, if known;
- anticipate the turning of the aircraft to join the flight path without overshoot, depending on the speed of the aircraft and the angle of interception; and
- ensure that the interception flight path is reliable with respect to ground and any nearby obstacles.

The precision required to follow an intercepted flight path, including a multitude of segments, varies along said flight path. Accordingly, the flight path monitoring accuracy is far greater during final approach than during cruise flight phases.

It is known that the pilot in the approach phase in a horizontal plane uses ILS (Indicator Landing System) type information, displayed by dedicated symbology of varying sensitivity, which is constantly increasing as the aircraft approaches the touchdown point. Conversely, during the cruise phase, in order to provide sufficient accuracy, a flight path segment monitoring procedure in the horizontal plane requires the pilot to select the most appropriate scale at a given moment, so as to comply with the required precision and/or use flight path deviation digital information combined with another dedicated symbology, for instance an HIS (Horizontal Situation Indicator).

Accordingly, the pilot following the current flight phase must make various selections and gather appropriate flight path deviation information to follow at various positions of the display screen (and even on two different screen pages), which information is generally presented using different formalisms.

Furthermore, during the periods of intense workload encountered by the pilot, omitting to modify a scale can have damaging consequences. Indeed, the pilot may believe erroneously that the aircraft is properly aligned on the flight path to follow whereas, in reality, the selected scale is too large.

Finally, in order to accomplish with satisfactory accuracy, the complete procedure demands a great deal of know-how and also intense attention and activity (high workload) throughout the interception and follow-up duration. Note that organization and dosing difficulties are essentially due to the fact that the customary instruments and/or symbologies used are not organized to present an obvious synthesis of the effective situation.

This invention concerns a device assisting with interception by an aircraft of a flight path segment located in a horizontal plane designed to remedy these drawbacks.

Indeed, according to the invention, said device assisting with interception by an aircraft of a flight path segment located in a horizontal plane, said device being brought abroad the aircraft and including:

- initial resources for determining the values of the aircraft parameters; and
- initial display resources to present on at least one display screen:
  - at least said flight path segment in the horizontal plane to be intercepted; and
  - an initial symbol illustrating the position of the aircraft in the horizontal plane with respect to said flight path, is outstanding in that the initial resources determine at least one ground speed vector representative of the speed of the aircraft with respect to the ground and in that said initial display resources are liable to present, in addition, on said display screen:

- a first means of indicating the ground speed corresponding to a first rectilinear section in said horizontal plane connected to said symbol whose angular orientation corresponds to the direction of said ground speed vector and whose length:
  - is proportional to the ground speed vector module when said ground speed is greater than a predetermined value; and
  - is fixed and proportional to the module of said predetermined value when said ground speed is less than or equal to this predetermined value;
- a second means of interception approach indication, corresponding to a second rectilinear in said horizontal plane, in the direction of said flight path segment to be intercepted and whose length adjusts automatically so that said second rectilinear section extends at one of its ends, said first rectilinear section and at the other of its ends, a third means of indication; and
- said third means of interception turn indication, corresponding to a curve portion including at least one circle arc in said horizontal plane, one end of said curve portion extending at a tangent into second rectilinear section and, at the other end, connected at a tangent to said flight path to be intercepted.

All this graphic information forms the flight path interception path which ends, if there is no flight path overshoot, in an interception turn (circle arc more or less deformed to allow for wind effect) in the horizontal plane. This graphic representation enables the pilot to see and act early enough to adjust his approach, then his interception turn. This results in a gain in terms of efficiency and availability because, in particular, it relieves the pilot of the need to release the controls.

In addition, thanks to the first means of indication, the pilot is given graphic information supplying him both with the real direction toward which the aircraft is moving and a first estimation of the ground speed vector module at which it is moving. In addition, this indication offers the advantage of being displayed close to a screen position used by the pilot a great deal during the pre-defined flight path interception/monitoring phase, i.e. said first symbol indicating the current position of the aircraft.

In an advantageous embodiment, said first means of display present the second means of indication on said display screen only:

- if a segment of the flight path is in the direction of said first rectilinear section of first indication resources; and if this segment is at a distance less than a predetermined distance with respect to said first rectilinear section, Thanks to said second means of indication, the pilot has synthetic graphic information giving him the future rectilinear interception flight path if he continues to fly with the same current ground speed vector (module and direction). As soon as the ground speed vector varies, said graphic information is updated in real time.

In addition, in an advantageous embodiment, said circle arc of the third means of indication includes a radius depending on the speed of the aircraft and/or the aircraft capacities. Furthermore, said circle arc may be deformed to allow for the intensity and direction of the wind.

Furthermore, in an advantageous embodiment,
if a flight path segment is in the direction of said second rectilinear section of the second indication resource;
if this segment is located at a distance less than a predetermined distance from said second rectilinear section; and
if the flight plan requirements make an interception maneuver possible.

Thanks to the third indication resource, the pilot has synthetic graphic information supplying him with the future turn to be made to intercept with and align on the flight path if the aircraft continues to fly along the same ground speed vector (module and direction).

In one specific embodiment, said interception assistance device includes, in addition, second means for detecting an obstacle and the first means of display are liable to present, in addition, on said display screen, at least a second symbol illustrating the position of said obstacle in said horizontal plane.

This invention also concerns an on-board system for assistance with the interception and monitoring by an aircraft of a flight path segment located in a horizontal plane. According to the invention, said system is outstanding in that it includes:
an interception aid device as specified above; and
a flight path follow-up aid device.

In addition, according to the invention, said flight path monitoring assistance device includes:
third means of determining:
a lateral deviation of the aircraft from a segment of the flight path in the horizontal plane; and
lateral margins tolerated either side of said flight path segment in the horizontal plane; and
second means of display liable to appear on the display screen:
a fixed (immobile) lateral deviation scale;
a fourth means of effective lateral deviation indication corresponding to a straight line segment provided for on said scale and illustrating the effective lateral deviation of the aircraft from the flight path segment to be followed; and
a fifth means of indicating excessive lateral deviation appearing on said scale when the aircraft approaches at a predetermined distance, one of said lateral margins.

In an advantageous embodiment, the size of the fixed scale remains constant thanks to the automatic adjustment of the proportion between the real deviation and its representation on the display screen. Accordingly, whatever the aircraft flight phase, the fixed scale preserves the same size on the display screen.

In addition, in an advantageous embodiment:
said straight line segment of said fourth means of indication is inclinable; extraordinary; and/or when said fourth means of indication reaches its stop, it changes form and remains at the stop; and/or
said fifth means of indication is flashing.

To assist with the interception of a flight path including a multitude of segments, advantageously, said second means of display will also present on said display screen a sixth means of indicating a change in flight path segment to follow.

In addition, advantageously, said second means of display will present on said display screen a seventh means of indicating the lateral velocity tendency.

In a simplified and preferred embodiment, said first display resources for the device providing interception assistance and said second means of display of the second monitoring assistance device will be part of one and the same display unit.

Furthermore, the system in accordance with the invention will also include means of transmitting information liable to connect said first means of said interception aid device and said third means of said monitoring aid device to an acceptance autopilot for the transmission of information. Accordingly, all the data generated by the first and third means can be transmitted to an autopilot, which deals with automatic aircraft guidance.

BRIEF DESCRIPTION OF THE DRAWINGS

The figures of the attached illustration provide a clear understanding of how the invention can be accomplished. In these figures, identical references designate similar items.

DETAILED DESCRIPTION OF THE INVENTION

Figure 1:
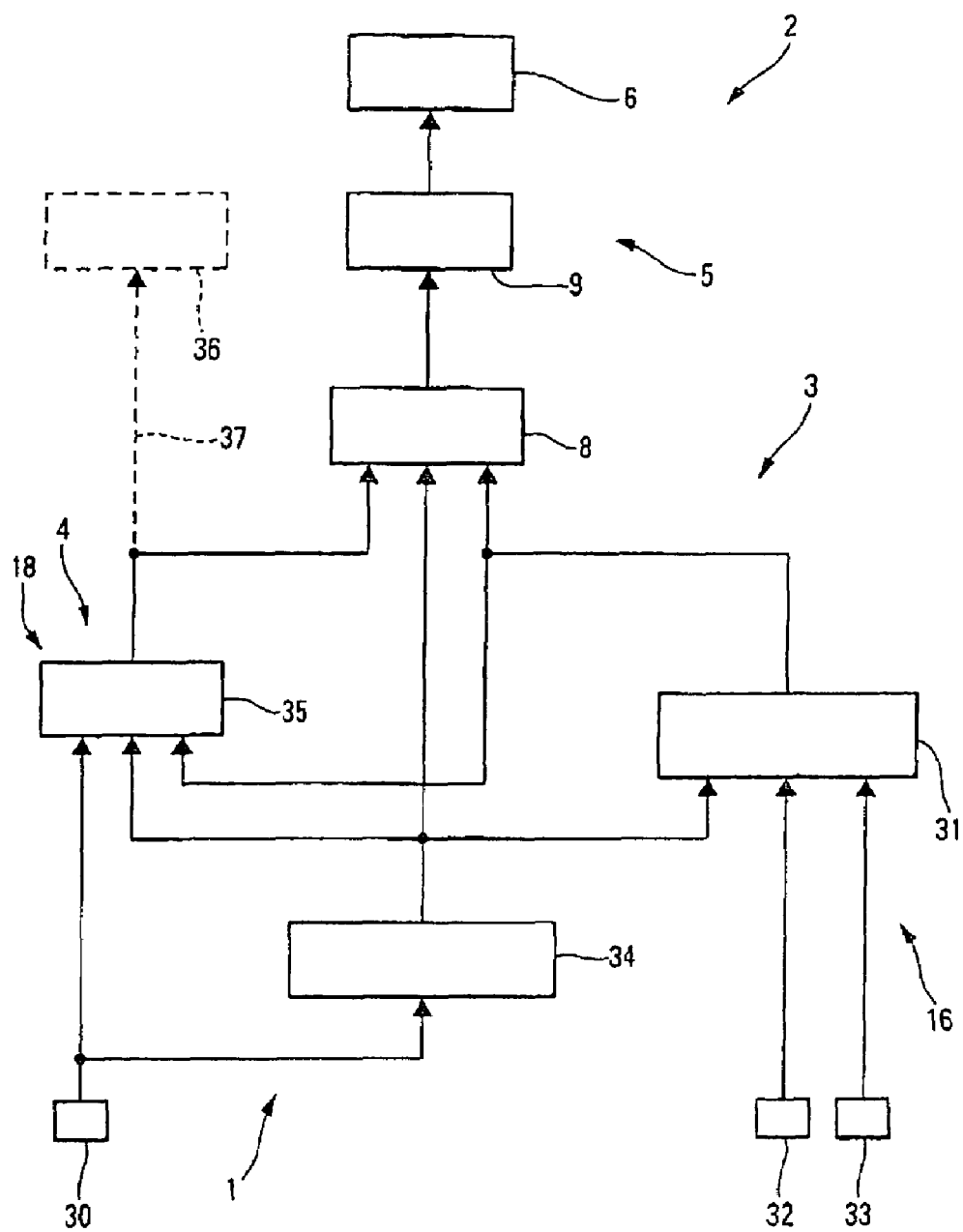
FIG. 1 is a block diagram of a system conforming to the invention.

Device 1 conforming to the invention is intended to assist with the interception by an aircraft of a flight path segment T located in a horizontal plane. This device 1 may be part of a system 2 conforming to the invention and represented schematically in FIG. 1, designed to assist with the interception and monitoring by an aircraft of a flight path segment of this type. To this end, said system 2 carried on the aircraft includes:
Interception aid device 1; and
flight path monitoring aid device 3.

Figure 2:
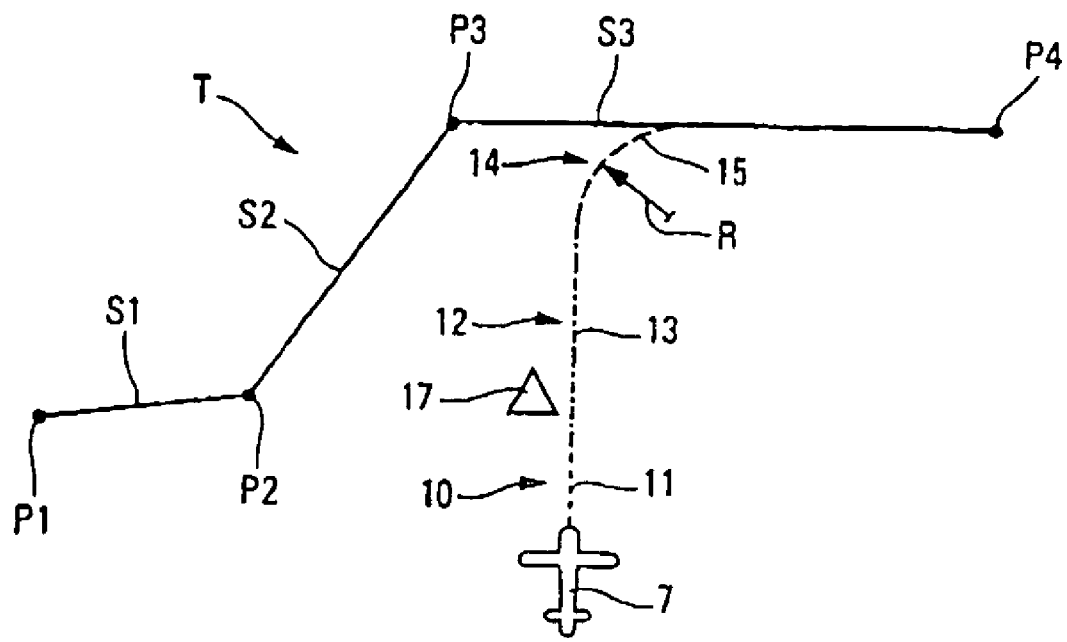
FIG. 2 illustrates the information displayed by means of an interception aid device conforming to the invention.

In a known manner, device 1 for interception aid includes:
means 4 for determining the values of the aircraft parameters; and
display means 5 for presenting, on at least one basic display screen 6, as shown in FIG. 2:
at least said segment S3 to be intercepted on flight path T. Flight path T includes, in the horizontal plane, a multitude of rectilinear segments S1, S2, S3 and S4, connected together or limited by points P1, P2, P3, P4; and a symbol 7 illustrating the position of the aircraft in the horizontal plane with respect to said flight path T.

Said means of display 5 include, in a customary manner:
a digital calculator 8 ensuring the transformation of the physical data received by resources 4 into data adapted to display on the screen; and
a symbol generator 9 or a plotter, capable of materializing on display screen 6, from the data supplied by conversion calculator 8, graphic characteristics of the presentation of the information as specified and envisaged in the following.

According to the invention, said means 4 determine at least one ground speed vector representative of the ground speed, i.e. the speed of the aircraft with respect to the ground and said display means 5, liable to appear on said display screen 6, in addition to the aforementioned indication and as represented in FIG. 2.

a means of indication 10 giving the ground speed corresponding to a first rectilinear section 11 in said horizontal plane which is connected to said symbol 7 and whose angular orientation corresponds to the direction of said ground speed vector, and whose length:
is proportional to the ground speed vector module when said ground speed is greater than a predetermined value; and
is fixed and proportional to the module of said predetermined value when said ground speed is less than or equal to said predetermined value.

A means of interception approach indication 12 corresponding to a second rectilinear section 13 in said horizontal plane toward said flight path segment S3 to be intercepted, and whose length is adjusted automatically so that the second rectilinear section 13 extends at one of its ends said first rectilinear section 11, and that the other of its ends, an indication resource 14; and said means of interception turn indication 14, corresponding to a portion of the curve including at least a circle arc 15 in said horizontal plane, one end of said curve portion extending at a tangent said section rectilinear section 13 and at the other end, connected at a tangent to said flight path segment S3 to be intercepted.

To make the drawing more understandable, rectilinear sections 11 and 13 of circle arc 15 have been depicted using different lines (broken) so as to provide a clear distinction. In practice they can, however, be continuous and be differentiated, for instance, using different colors.

Thanks to said means of indication 10, the pilot is given graphic information supplying him with both the real direction toward which the aircraft is moving and an initial estimation of the ground speed vector module at which the aircraft is moving. In addition, this indication offers the advantage of being displayed near a screen position used specifically by the pilot during the interception and monitoring phase of a pre-defined flight path, i.e. said symbol 7, indicating the current position of the aircraft.

The means of display 5 present said means of indication 12 on said display screen 6 only:
a) if a segment S1, S2, S3 of flight path T is in the direction of the first rectilinear section 11 of the indication means 10; and
b) if this segment S1, S2, S3 (segment S3 in general in FIG. 2) is at a distance less than a predetermined distance with respect to said first rectilinear section 11.

Conversely, if at least one of the two previous conditions a) and b) is not fulfilled, the means of display 5 will not display said means of indication 12.

Thanks to said means of indication 12, the pilot is given synthetic graphic information supplying him with the future rectilinear interception flight path if he continues to fly with the same ground speed vector (module and direction).

Furthermore, circle arc 15 of means of indication 14 includes a radius R depending on the speed of the aircraft and/or the aircraft capacities.

Figure 3:
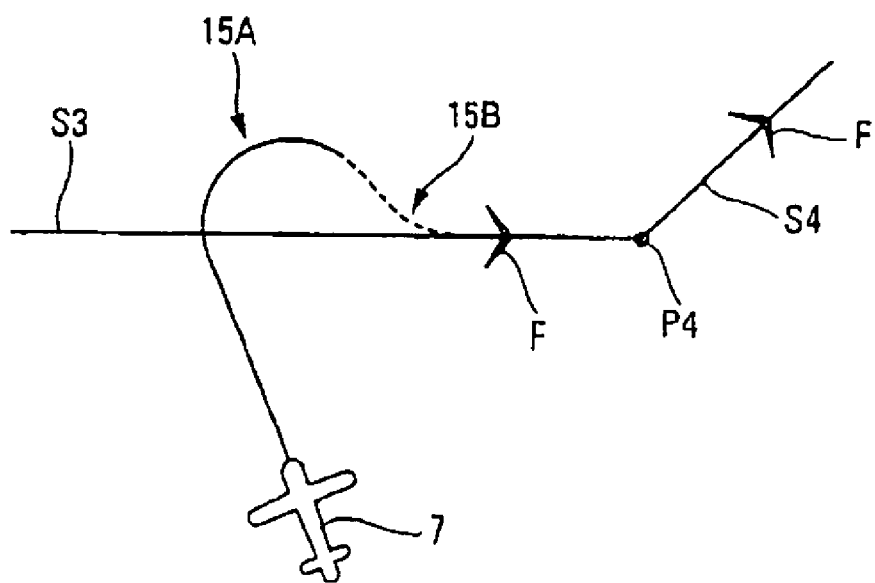
FIG. 3 is a schematic view of a particular case of interception.

By default, the interception turn is calculated to the benefit of a rounded form, therefore without any overshoot of the flight path over segment S3 of the flight path to be intercepted unless the pilot has first chosen this option, or if the maneuver to be carried out by the pilot necessarily involves an overshoot (for instance because the aircraft is too close to segment S3 to be intercepted). Accordingly, in the case of a flight path overshoot, the final circle arc 15 will be replaced by circle arcs 15A and 15B tangents in twos, as represented in FIG. 3 two circle arcs 15A and 15B (the arrows F indicate the direction of flight).

It should be noted that in the presence of wind, circle arc 15 or circle arcs 15A and 15B can be deformed to allow both for the intensity of the wind and its direction.

Furthermore, said means of display 5 present said means of indication 14 on said display screen 6 only:
α) if a segment S3 of flight path T is in the direction of said second rectilinear section 13 of the means of indication 12.
β) if said segment S3 is located at a distance less than a predetermined distance compared to the second rectilinear section 13; and
γ) if the demands of the flight path render an interception maneuver possible.

Conversely, if at least one of the three previous conditions α), β) and γ) is not realized, the means of display 5 will not display said means of indication 14.

Thanks to said means of indication 14, the pilot has synthetic graphic information supplying him with the future turn to be made to intercept and align on said flight path segment S3, if the aircraft continues to fly at the same current ground speed vector (module and direction). As soon as the ground speed vector varies, said graphic information will be updated in real time.

In one specific embodiment, said interception assistance device 1 will include, in addition, means 16 for detecting an obstacle (natural or man-made) and said display means 5 are liable to present, in addition, on said display screen 6, at least one symbol 17 (FIG. 2) illustrating the position of at least the nearest obstacle in said horizontal plane.

It is also possible during interference with the relief (information supplied by a field module hosted, for instance, by a mapping calculator, a GCAS (Ground Collision Avoidance System) or with a detected obstacle (detection for instance by radar, laser) that the means of indication color 10 changes and, for instance, changes to amber or red.

Furthermore, as indicated previously, system 2 includes, in addition to device 1 for interception assistance specified above, a device 3 assisting with flight path follow-up.

Figure 4:
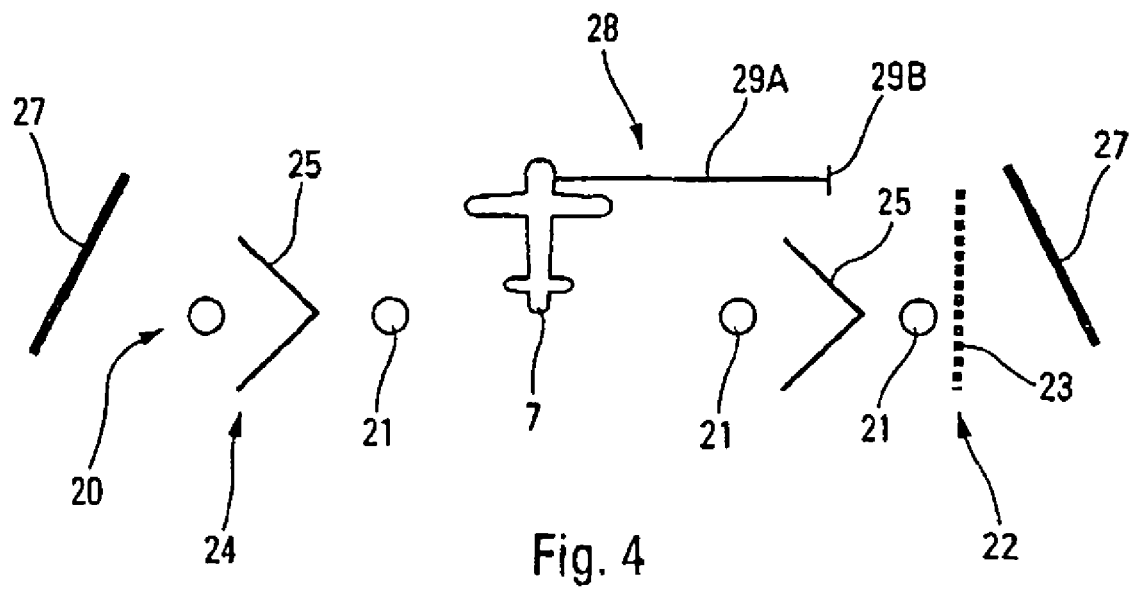
FIG. 4 illustrates the information displayed by means of a monitoring aid device conforming to the invention.

According to the invention, said device 3 assisting with flight path follow-up includes:
means 18 for determining a lateral deviation of the aircraft from a flight path segment S3 in the horizontal plane and the tolerated lateral margins either side of said flight path segment S3; and
said means of display 5 that are liable to present, on the display screen 6 as represented in FIG. 4:

a fixed (immobile) lateral deviation scale 20 provided with markers 21, for instance circles;

an effective means of lateral deviation indication 22 corresponding to a straight line segment on said scale 20 and illustrating the effective lateral deviation of the aircraft compared to flight path segment S3 to be followed; and a means of indicating excessive lateral deviation 24 including chevrons 25 appearing at said scale 20 when the aircraft approaches, at a predetermined distance, one of said lateral margins.

Said fixed scale 20 is of a constant size in all the flight phases thanks to the automatic adjustment of the proportions between the real distances and their representation on display screen 6. This adjustment of the proportion takes into consideration the real and variable width of a basic corridor 26 relative to the required flight accuracy along flight path T to be followed and the variable form of the limits of said corridor 26. In reality, it is agreed that the required follow-up precision is variable throughout the length of flight path T. For instance, the required flight path monitoring precision is naturally far greater during final approach than during a cruising phase.

Figure 5:
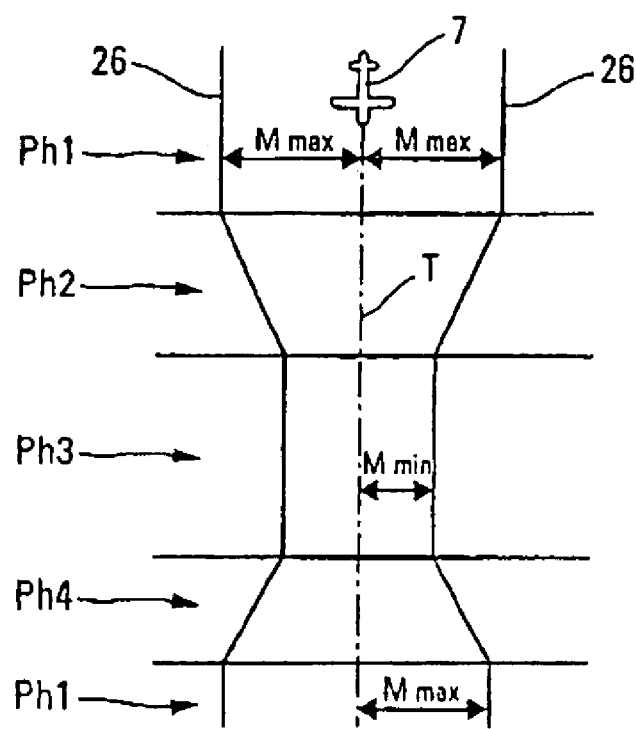
FIG. 5 is a schematic view of the various flight phases with the corresponding required flight details.

This required precision thus forms a corridor 26 all along the length of flight path T, generally breaking down into four parts (or flight phases), distinct and successive, of variable width, as shown in FIG. 5:

in a phase Ph1 (cruise phase), the required precision is less but remains constant at a value Mmax (maximum margin or maximum tolerated lateral deviation);

in a phase Ph2 (start of approach), the required precision will increase gradually to achieve the maximum value. The maximum tolerated lateral deviation decreases gradually to achieve a value Mmin (minimum margin or minimum tolerated lateral deviation);

in a phase Ph3, corresponding to the final approach or the beginning of throttle re-application, the required accuracy is maximum but stays constant at value Mmin; and in a phase Ph4 (takeoff), the accuracy gradually decreases to achieve the value Mmax of phase Ph1.

Figure 6:
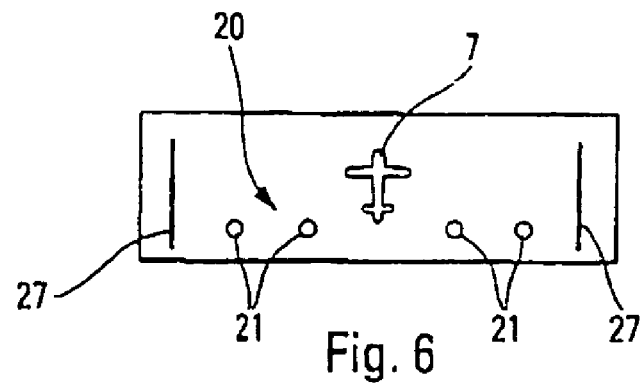
FIGS. 6 to 19 illustrate the various displays possible using a monitoring aid device conforming to the invention.
Figure 7:
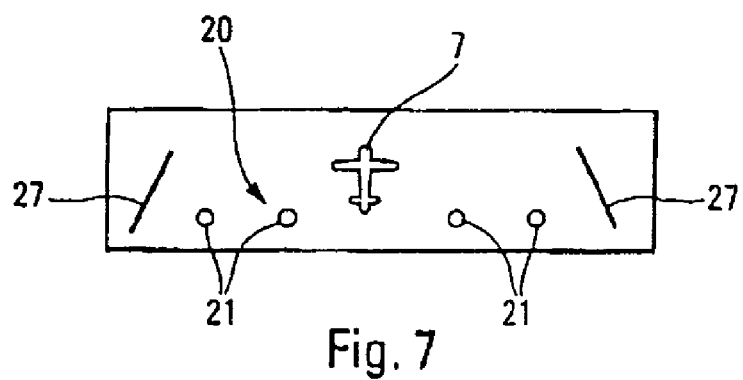
Figure 8:
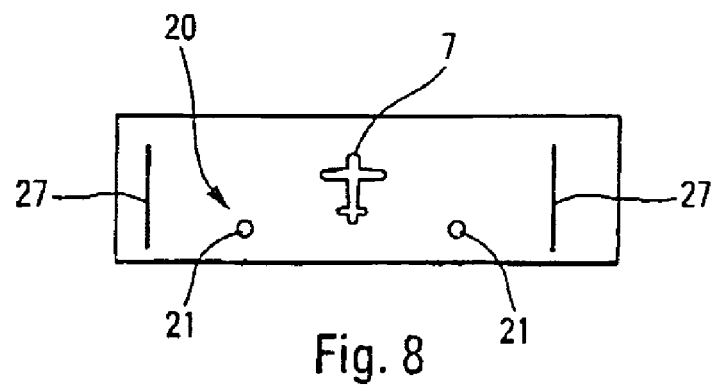
Figure 9:
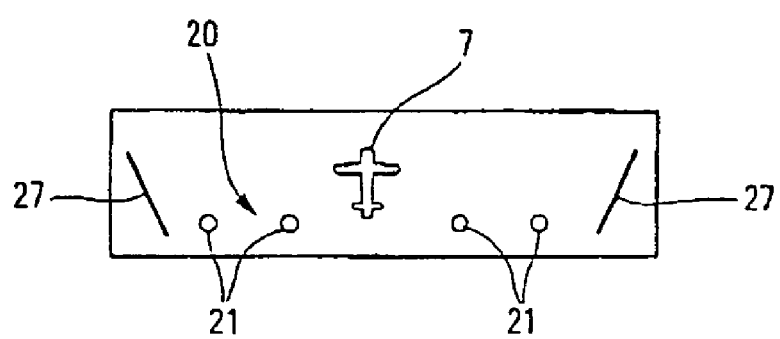

Accordingly, the various plots of the fixed scale 20 are as follows:

for phase Ph1 (cruise phase), the actual width of corridor 26 relative to the required flight precision is constant and takes on value Mmax. Markers 21 (for instance four circles) are plotted and the shape of the corridor 26 limits is symbolized by two straight longitudinal lines 27 (FIG. 6);

for phase Ph2 (beginning of approach), the real width of corridor 26 relative to the required flight precision varies and shrinks to achieve the value Mmin. Markers 21 (four circles, for instance) are plotted and the shape of the limits of corridor 26 is symbolized by two longitudinal lines 27, the upper end of which inclines toward symbol 7 of the aircraft (FIG. 7);

for phase Ph3 (final approach or beginning of throttle re-application), the real width of corridor 27 relative to the required flight precision is constant and takes on value Mmin. To discriminate easily this phase Ph3 from phase Ph1, it also has a real and constant width, but of far greater size and fewer markers 21 are displayed than in phase Ph1 and Ph2 that precede (for instance, only two markers 21 instead of four in phase Ph1 and Ph2) that are, however, at wider intervals. Conversely, the shapes of the limits of corridor 26 remain symbolized by two longitudinal straight lines 27 (FIG. 8);

for phase Ph4 (takeoff), the real width of corridor 26 relative to the required flight accuracy varies and increases gradually to achieve the value Mmax. Accordingly, more markers 21 than in phase Ph3 (e.g. four markers or circles) are again plotted, and the form of the corridor limits is symbolized by two longitudinal lines 27, the upper ends of which incline toward the outside of scale 20 (FIG. 9).

Figure 10:
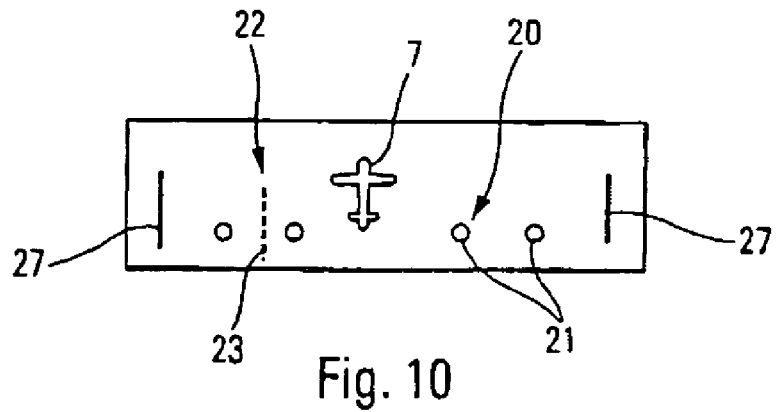

The means of indication 22 includes a longitudinal straight-line segment 23 (FIG. 10), the width of which does not vary on display screen 6. This straight-line segment 23 represents a lateral distance deviation cursor, which moves horizontally between two variable limits of scale 20 in proportion to the current lateral deviation (effective) generated by means 18. The sensitivity of this cursor is therefore also variable. For instance, it is more emphatic during the approach phase, which requires greater accuracy than during the cruise phase. Naturally, when the aircraft is positioned exactly and stably on the horizontal flight path to be followed, this straight-line segment or cursor 23 passes exactly below symbol 7 illustrating the aircraft.

Figure 11:
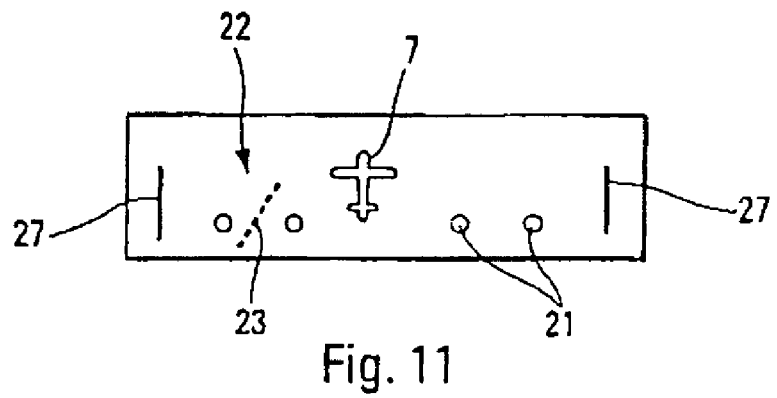

Note that during a change of flight path segment or when the flight path segment being followed is curved, this lateral distance deviation cursor 23 may be inclined in the direction of the turn (FIG. 11).

Figure 12:
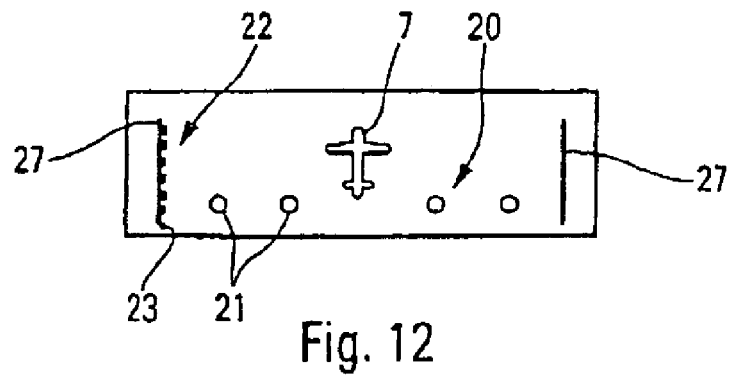
Figure 13:
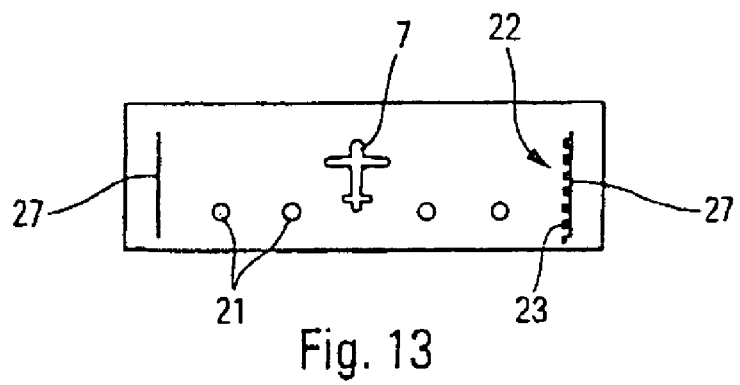

When means of indication 22 reaches the limit (right or left) of corridor 26 relative to the required flight accuracy, whatever the current flight phase, it continues to be displayed but its representation is modified. For instance, it is plotted as dotted lines (FIG. 12 for a left limited and FIG. 13 for a right limit), whereas it is in a continuous line in all the other cases (although for the understanding of the illustration and ease of discrimination of said means of indication 22, the latter is shown in dotted lines in all the figures). This limit case must be consecutive to the display of excessive lateral deviation chevrons 25 because the graphic scale of the visual guide is adjusted constantly so that corridor 26 relative to the required horizontal real flight precision either side of the aircraft is fully displayed.

Furthermore, to assist with the interception and follow-up of a flight path T including a multitude of segments S1, S2 and S3, said means of display 5 also offer on display screen 6, a means of indicating a change of flight path segment to be followed. Preferably, it will concern straight segment 23 which in this case will flash.

According to the invention, the chevrons 25 appear as flashing at a fixed scale 20 whatever the current flight phase and as soon as the aircraft moves too close to the lateral limits (right or left) of corridor 26 relative to the required flight precision. Accordingly, the pilot persists in moving horizontally away from the set flight path, the symbology relative to device 3 providing assistance with follow-up and chevrons 25 will finally disappear. The pilot will then be obliged to use the interception assistance device 1 if he wishes to join the flight path T he has left (at any point).

Figure 14:
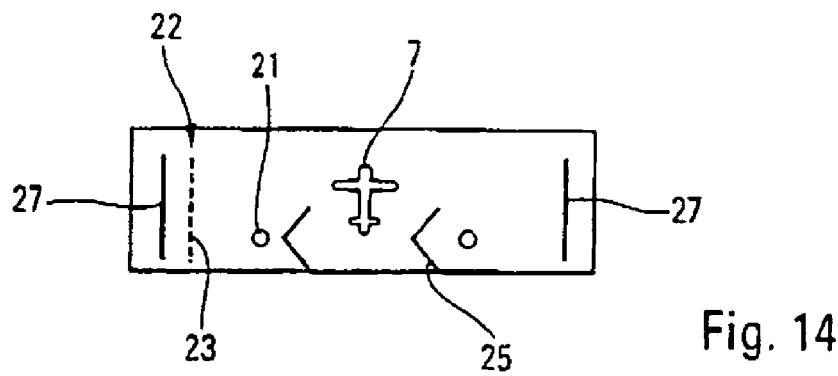
Figure 15:
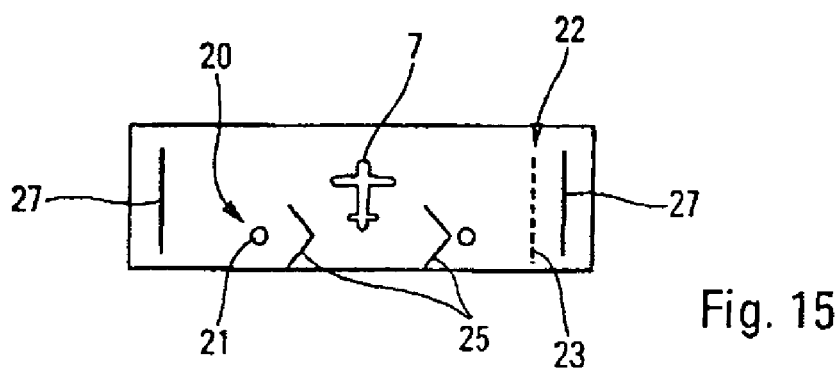

If we refer to the previous scale examples illustrating the description of this visual guide, it becomes important to note that the two chevrons 25 are arranged at either side of symbol 7 illustrating the aircraft if fixed scale 20 includes two markers or circles 21, as is the case of flight phase Ph3 (FIGS. 14 and 15 for excessive deviations respectively to the right and to the left).

Figure 16:
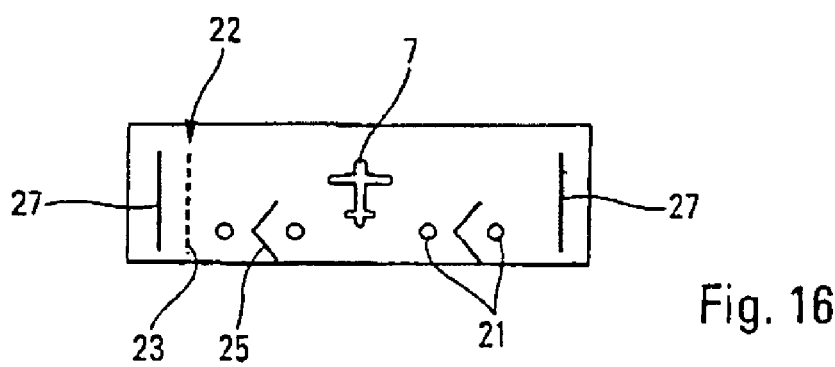
Figure 17:
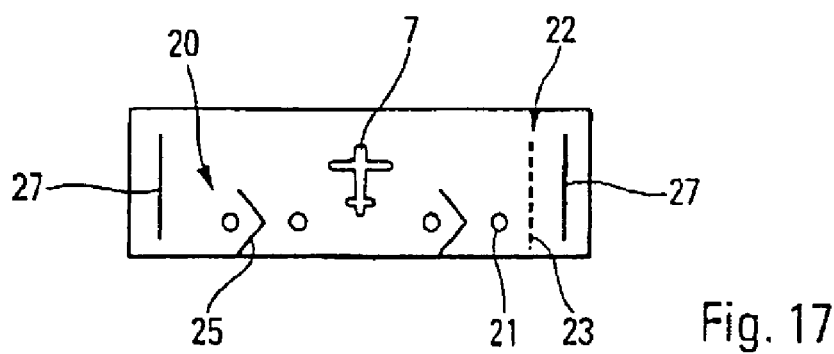

Conversely, the chevrons 25 are plotted between two successive circles 21 if said same fixed scale 20 is made up of four circles 21, as is the case of flight phases Ph1, Ph2 and Ph4 (FIGS. 16 and 17 for excessive deviations respectively toward the right and toward the left).

Figure 18:
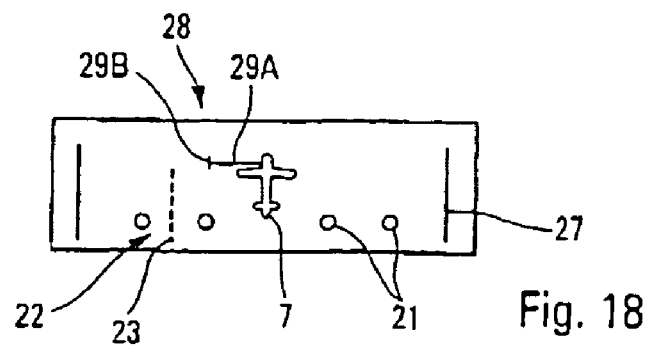

Said means of display 5 also present, on said display screen 6, a means of indication 28 of the lateral speed tendency. This means of indication 28, shown for instance in FIG. 18, includes a horizontal segment 29A connected to aircraft symbol 7, terminating in a vertical segment 29B (or a perpendicular arrow point, pointing toward fixed scale 20 for the lateral deviation). This means of indication 28 corresponds to the drifting of the current lateral deviation and, in real time, points to the next lateral distance with respect to the flight path, as it will be here, of a particular and predetermined duration.

Figure 19:
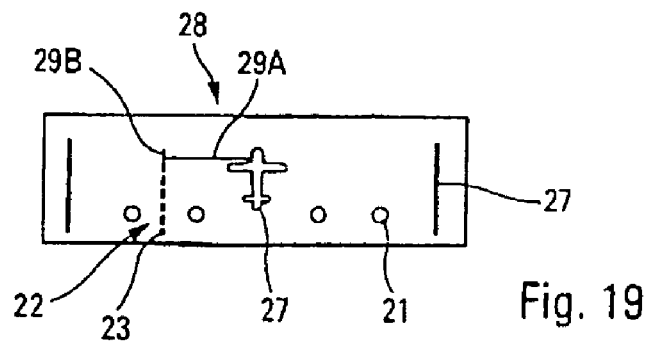

If vertical segment 29B (or the tip of the arrow) is continuously superimposed on straight segment 23 (lateral distance deviation cursor) of the means of indication 22 as shown in FIG. 19, by suitable flight control, the pilot may gradually and in an optimized manner, cancel out the value of the current lateral deviation and thus perform optimized interception within the horizontal plane of flight path T.

Thanks to the invention, the process of intercepting a flight path T in the horizontal plane and its follow-up is carried out accurately and efficiently according to the four following steps E1 to E4.

1/Initial Outright Determination of the Interception Point Step E1

Figure 20:
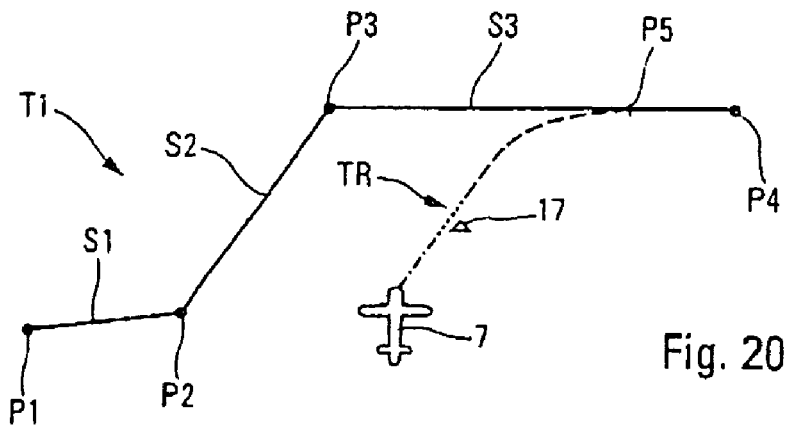
FIGS. 20 to 26 illustrate the various steps involved in the interception and monitoring of a flight path.
Figure 21:
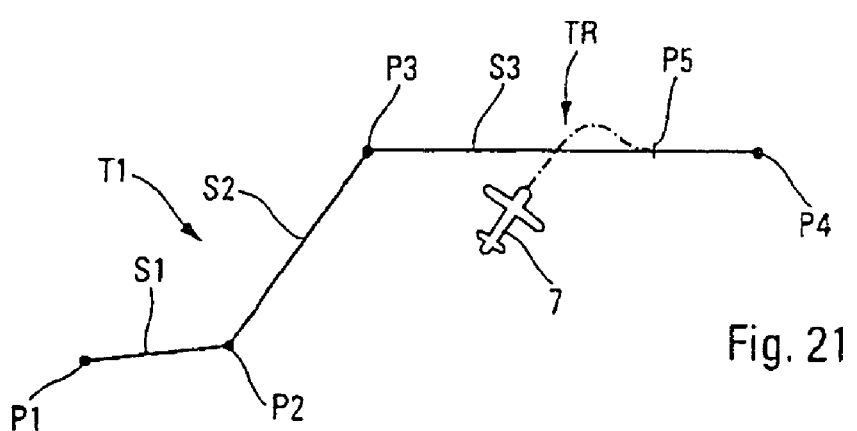

The aircraft has abandoned following flight path T1 comprising three segments S1, S2 and S3 while it was directed toward a point P2. Then, the pilot wishes to reintegrate the following up of flight path T1 at a point P5. To do this, the pilot directs the aircraft (ground speed vector) toward this point P5. In this case, it will be seen that device 1 may report to it that the approach flight path TR is unsuitable for two reasons:

either it interferes with the ground (or an obstacle) at one or several points, the closest of which is highlighted and symbolized by a symbol 17, for instance a red triangle (FIG. 20). Note that in this example, the aircraft has generated considerable slip due to the wind, explaining why the ground speed vector direction is no longer in line with the aircraft;

or the current ground speed of the aircraft is excessive because of its nearness to the segment to be intercepted, obliging it to overshoot the flight path (FIG. 21).

2/Convergence Step E32

Figure 22:
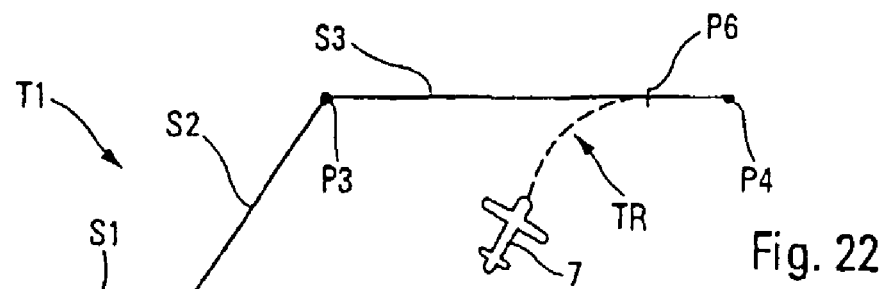

The pilot modifies the route of his aircraft so that the point of conflict with the ground (or the obstacle) disappears and/or slows down by reducing the ground speed module to eliminate the flight path overrun; an interception turn at a pre-defined factor appears at the end of the display on device 1. The approach flight path TR converges toward the same segment S3, but at a point P6 (FIG. 22) further downstream than P5. Accordingly, in the two aforementioned cases, the pilot will have been able to see and act early to adjust the approach and then his interception turn.

3/Interception Step E3

Figure 23:
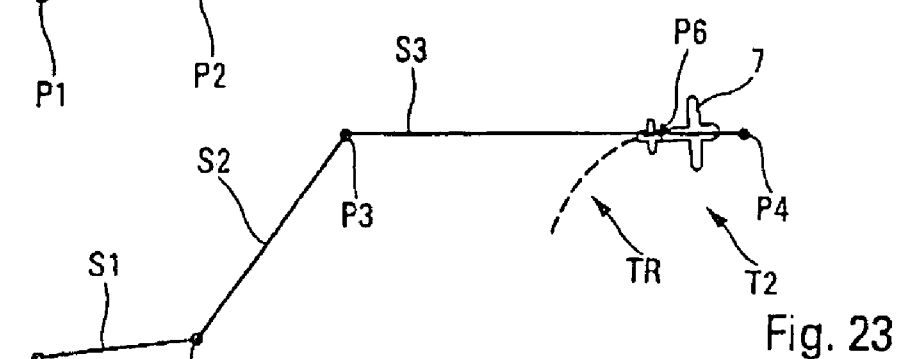
Figure 24:
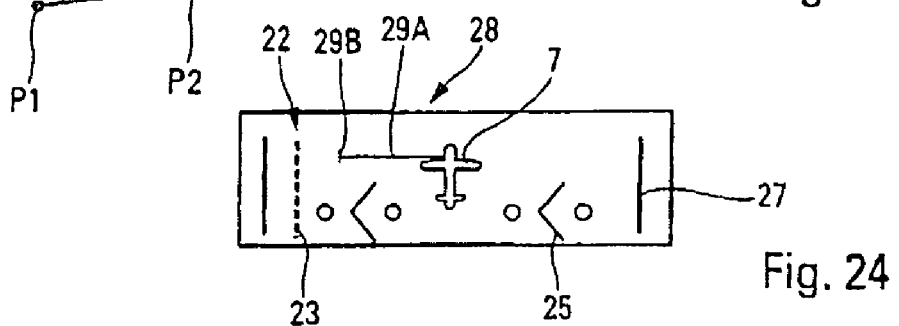

The pilot sets approach flight path TR derived from device 1 by engaging it (action on a control). In this way, he obtains a new flight path T2 to follow, replacing the former flight path T1 (with T2=TR+part of T1 starting from interception point P6). In addition, the next new target to be achieved is point P4 (FIG. 23), replacing the former target, point P2. From then on, device 3 supplies the pilot with the lateral deviation of the aircraft with respect to the new flight path T2 (FIG. 24).

If he is too far away from the latter, excessive deviation chevrons 25 will appear informing him that he must immediately move closer to said flight path T2, which is to his left in this example, or otherwise leave the precision corridor.

4/Precise Follow-up of Flight Path Step E4

Figure 25:
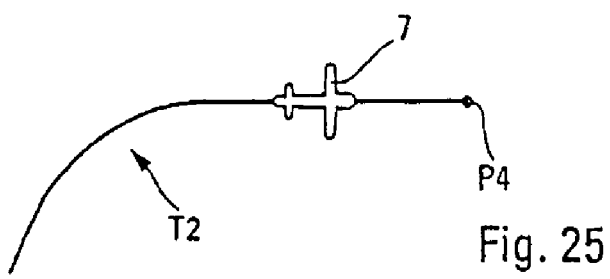
Figure 26:
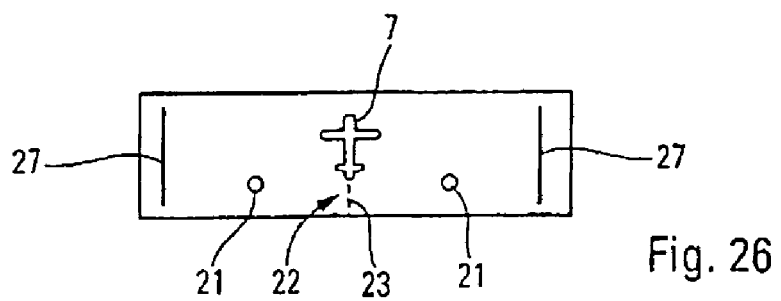

System 2 conforming to the invention guides the pilot into flight path T2 (FIG. 25) by means of device 3. To do this, the pilot simply needs to cancel the lateral deviation and bring cursor 23 for the lateral deviation under symbol 7 of the aircraft (FIG. 26). Device 3 also reminds the pilot that he is in the final approach phase at point P4 and that the scale sensitivity is therefore maximum so that he can fly accurately in the horizontal plane.

System 2 conforming to the invention also includes means of display 5, means 4, 16 and 18 as mentioned above, including, as shown in FIG. 1:

a localization system 30 including sensors (satellites, etc.) supplying the three dimensional precise position of the aircraft;

a system 31 including ground and models 32 and/or sensors 33 detecting any conflicts in the approach flight path with respect to the ground and/or the obstacles;

a calculator 34 generating an approach flight path and the lateral follow-up margins; and a calculator 35, which, once interception has been carried out, calculates the deviations and ground speed in the horizontal plane of the aircraft with respect to the setpoint flight path and determines the current flight phase.

Note that aforementioned means 30, 31, 34 and 35 are sufficient to supply secure guidance information needed by the aircraft autopilot 37, in this case the information allows he interception and then the follow-up of the flight path. To this end, all the data generated by the approach and follow-up flight path calculator 34 can be exported by the customary means of transmission 37 to an autopilot 36 in such a way that the latter can then fly the aircraft automatically.

The invention claimed is:

1. A method for assisting a pilot to fly an airplane to intercept a flight path, the method comprising the steps of:

calculating a ground speed vector of the airplane;

displaying on a display screen in the airplane a representation of the flight path;

displaying on the display screen a first symbol representing a position of the airplane relative to the flight path;

displaying on the display screen a first indicator that is attached to said first symbol and that is a straight line with an angular orientation corresponding to a direction of the ground speed vector and with a length that varies and corresponds to a magnitude of the ground speed vector when the magnitude exceeds a predetermined value and that is constant and proportional to the predetermined value when the magnitude is less than or equal to the predetermined value;

displaying on the display screen a second indicator that is attached to said first indicator and that is a straight line whose direction represents an initial part of a future approach path for the airplane to intercept the flight path and whose length adjusts as the position of the airplane changes relative to the flight path; and displaying on the display screen a third indicator that extends tangentially from said second indicator and that is connected tangentially to the flight path, said third indicator being a curved line representing a final part of the future approach path for intercepting the flight path, wherein the flight path to be intercepted and the first, second, and third indicators are displayed on the screen at the same time.

2. The method of claim 1, further comprising the step of delaying the display of the second and third indicators on the display screen until the direction of the ground speed vector intercepts the flight path and until the airplane is less than a predetermined distance from the flight path.

3. The method of claim 1, further comprising the step of making a curvature of said third indicator depend on at least one of an airspeed of the airplane, a turning capability of the airplane, and wind speed and direction.

4. The method of claim 1, further comprising the step of delaying the display of said third indicator until a curvature of said third indicator is achievable by the airplane.

5. The method of claim 1, further comprising the steps of detecting an obstacle and displaying on the display screen a second symbol representing a relative position of the detected obstacle.

6. The method of claim 1, further comprising the step of transmitting flight information for intercepting the flight path to an autopilot that controls movement of the airplane, the flight information being based on the first, second, and third indicators.

7. The method of claim 1, further comprising the step of providing said third indicator with two parts, a first one of said two parts being a curved line extending tangentially from said second indicator and crossing the flight path and a second one of said two parts being a curved line extending tangentially from said first part and being connected tangentially to the flight path.

8. The method of claim 1, wherein the method further assists the pilot to fly the airplane to follow the flight path after the airplane has intercepted the flight path, and further comprises the steps of:

calculating a lateral deviation of the airplane from the flight path and tolerated lateral margins on both sides of the flight path, wherein said first symbol indicates the lateral deviation of the airplane from the flight path by a relative position of said first symbol to said flight path;

displaying on the display screen a lateral deviation scale; and displaying on the display screen an excessive lateral deviation marker when the airplane is approaching one of said tolerated lateral margins.

9. The method of claim 8, further comprising the step of automatically adjusting a distance indicated by said lateral deviation scale as a flight corridor width defined by said tolerated lateral margins changes.

10. The method of claim 8, further comprising the step of displaying on the display screen slanted lines indicating a change in a width of a flight corridor defined by said tolerated lateral margins.

11. The method of claim 8, further comprising the step of displaying on the display screen a lateral drift indicator that represents a lateral drift speed of the airplane, said lateral drift indicator being attached to said first symbol and varying in length in proportion to the lateral drift speed.

* * * * *